United States Patent Office 3,511,820
Patented May 12, 1970

3,511,820
SOLID POLYMERS OF 2-PHENYLALLYL ALCOHOL AND ITS ESTERS WITH MALEIC ANHYDRIDE AND TERPOLYMERS THEREOF WITH VINYL MONOMERS
Joseph A. Verdol, Dolton, and Mark O. Thienot, Park Forest, Ill., assignors to Sinclair Research, Inc., New York, N.Y., a corporation of Delaware
No Drawing. Filed Aug. 21, 1967, Ser. No. 661,805
Int. Cl. C08f 39/00, 17/00
U.S. Cl. 260—78.5     16 Claims

ABSTRACT OF THE DISCLOSURE

Solid polymers of 2-phenylallyl alcohol and its esters, such as 2-phenylallyl acetate, with maleic anhydride, maleic acid and their esters are formed using free radical initiators and various polymerization techniques. Polymerizable vinyl monomers such as styrene can also be incorporated in the polymer.

---

This invention relates to the production of polymers of 2-phenylallyl alcohol and its esters with maleic anhydride, maleic acid or their derivatives by employing, for example, bulk and solution polymerization with free radical initiators. Vinyl monomers such as styrene can also be incorporated during the polymerization to produce various polymers.

Polymers of 2-phenylallyl alcohol and maleic anhydride, maleic acid or their derivatives may be considered as low molecular weight polyelectrolytes and are of importance as alkali-soluble polymers and reactive resins. The polymers have broad use in emulsion polymerization, coatings, adhesives, detergents, floor polishes and fabric finishings. Polymers of 2-phenylallyl esters (such as 2-phenylallyl acetate) with maleic anhydride, maleic acid or their derivatives are reactive polymers possessing a high degree of solubility in organic solvents and are important, therefore, in the manufacture of lubricating oil and fuel additives as well as for the preparation of plastics, coatings, molding resins and related materials. By also incorporating a vinyl monomer, such as styrene, into these polymers, new polymer compositions may be obtained having various physical properties and a variety of uses, for example, as plasticizers, coatings, laminating resins, molding resins, foamed plastics and other materials.

It has now been found that a series of high melting (80–310° C.), alternating polymers possessing very unique structural combinations may be formed by polymerizing 2-phenylallyl alcohol with maleic anhydride, maleic acid or their derivatives in such proportions that the mold ratio of 2-phenylallyl alcohol to the maleic compound in the alternating polymer formed is from about 1:0.9 to 1:8 and preferably from 1:1 to 1:5. For example, when 2-phenylallyl alcohol and maleic anhydride are reacted with conventional free radical initiators such as azobisisobutyronitrile, lauroyl peroxide, benzoyl peroxide, dicumyl peroxide, 2,5-dimethyl - 2,5 - ditertiarybutylperoxy hexane and the like, a series of products comprising alternating 2-phenylallyl maleic anhydride units are obtained. Owing to the interaction between the free anhydride groups and hydroxyl groups in the polymer backbone, however, the final polymer products may also contain other reactive functional groups, such as free carboxylic acids, cyclic 5- or 6-membered lactones, unsaturated linear esters, crosslinked esters, as well as combinations of these groupings. These various structural groupings are formed prior to, during or following the polymerization reaction.

The present invention further concerns the production of high melting (80–310° C.) alternating polymers of 2-phenylallyl esters, such as 2-phenylallyl acetate, and maleic anhydride, maleic acid or their derivatives wherein the mole ratio of ester to maleic compound in the alternating polymer is from about 1:0.9 to 1:8. Because the 2-phenylallyl ester, unlike the alcohol, does not exhibit a hydroxyl group, there is no cyclic lactone formation and the polymer displays unreacted anhydride and ester groups. This is significant since the anhydride groups are hydrophilic and the ester groups are hydrophobic and, therefore, affects the solubility characteristics of the polymer. It is, therefore, possible to synthesize polymers of this type in such a way as to provide a balance of ester and anhydride groups which will produce desired solubility characteristics. For example, by varying the chain length of the ester (e.g., by varying the chain length of the acid used to esterify the 2-phenylallyl alcohol), an entire series of alternating polymers of maleic anhydride can be prepared to meet specific requirements for a particular application. Thus, polymers showing high solubility in hydrocarbon solvents and many organic monomers and polymers can be prepared, such as the polymers of 2-phenylallyl stearate, 2-phenylallyl isooctoate and other higher esters of 2-phenylallyl alcohol with maleic anhydride, which are useful for the preparation of oil-soluble lubricating oil and fuel additives. The anhydride groups present in the polymer may also be modified, if desired, by further reaction with ammonia, amines, alcohols and the like; or if desirable, the anhydride groups may be converted to sodium, potassium, calcium, barium, nickel, zinc, lead, cobalt, iron, and related metallic salts by reaction with appropriate metal oxide or basic salts.

The 2-phenylallyl esters for use in the present invention may be derived from the reaction of 2-phenylallyl alcohol with carboxylic acids or carboxylic anhydrides. Alternatively, these ester derivatives may be prepared by the reaction of 2-phenylallyl chloride with alkali metal salts of carboxylic acids (such as sodium acetate, sodium stearate, etc.). The 2-phenylallyl esters have the following structure:

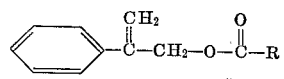

The R group in the above formula is a hydrocarbon radical, usually having up to about 24 carbon atoms, preferably 2 to 18 carbon atoms, such as alkyl, particularly lower alkyls, aryl, or combinations thereof which may be substituted with oxygen, nitrogen, halogen, nitro, cyano, amino, aminoalkyl, dialkylamino alkyl, amino aryl dialkylaminoaryl, and the like. Typical acids which may be employed to esterify the 2-phenylallyl alcohol to prepare these derivatives are acetic acid, propionic acid, chloroacetic acid, cyanoacetic acid, nitroacetic acid, alpha-amino acetic acid, alpha-dialkylamino acetic acid, alpha-hydroxyacetic acid, alpha-ethoxy acetic acid, stearic acid, 12-hydroxystearic acid, oleic acid, etc. Esters of the aforementioned acids may also be employed. When these esters are used to esterify 2-phenylallyl alcohol, the reaction is conducted by ester interchange techniques which are commonly employed in the art of esterification. Finally, the alkali metal salts of the aforementioned carboxylic acids may be reacted with 2-phenylallyl chloride to form the desired 2-phenylallyl esters. In such cases the reactions are preferably carried out in alcoholic solvents (such as methanol or ethanol) or in another polar solvent such as dimethyl sulfoxide, dimethyl formamide, tetrahydrofuran and the like.

While maleic anhydride is the preferred monomer for use in the production of alternating copolymers of 2-phenylallyl alcohol and its esters, maleic acid or anydride derivatives are also useful for this purpose. These derivatives comprise esters of the following chemical structures:

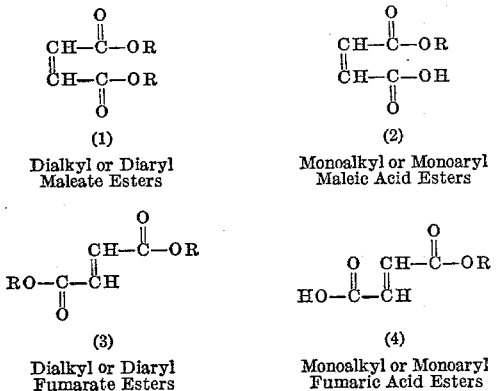

(1) Dialkyl or Diaryl Maleate Esters (2) Monoalkyl or Monoaryl Maleic Acid Esters (3) Dialkyl or Diaryl Fumarate Esters (4) Monoalkyl or Monoaryl Fumaric Acid Esters The R group in these structures can be similar to the R group of the 2-phenylallyl esters and thus can be alkyl or aryl radicals, or combinations thereof, and can be substituted with other functional groups which do not adversely affect the course of the polymerization reaction. These substituents can be oxygen, halogen, nitrogen, or cyano substituted alkyl or aryl groups. They can also comprise groups derived from alkanol amines such as dialkylaminoalkanols (e.g., dimethylaminoethanol, diethylaminoethanol, dibutylaminoethanol, dimethylaminopropanol and the like).

Finally, the incorporation into the 2-phenylallyl alcohol (or 2-phenylallyl ester)-maleic anhydride system of one or more other monomers in amounts sufficient to provide from about 0 to 8 and preferably about 1 to 5 moles of the monomer in the final product, provides a simple means for preparing products in which acid number, melting point, solubility in aqueous and non-aqueous systems and other physical properties may be varied to afford products to meet specific end-use applications. The monomers which may be employed for this purpose are polymerizable vinyl monomers which show a favorable copolymerization with these materials. Such monomers often have up to about 20 carbon atoms and include styrene, alpha-methylstyrene, ortho and para chlorostyrene, methyl methacrylate, ethyl acrylate, vinyl acetate, vinyl methyl ether, alpha olefins (e.g., ethylene, propylene, butene-1, octene-1), acrylonitrile, acrylamine, butadiene, isoprene, chloroprene as well as hosts of other vinyl monomers.

A variety of polymerization systems may be employed in accordance with the present invention, such as bulk polymerization (no solvent), aqueous suspension polymerization, heterogeneous solution polymerization (use of a solvent which solubilizes the monomers but not the final polymer) and homogeneous solution polymerization (use of solvents in which both monomers and polymers are soluble such as acetone, methyl ethyl ketone, tetrahydrofuran, dimethyl sulfoxide, dimethyl formamide or any organic solvent which is capable of solubilizing both monomers and polymers and which does not unduly affect the rate of yield of the polymerization reaction adversely).

The type of polymerization system (catalysts and solvent) as well as polymerization temperature employed in the present invention are dependent upon the structure and molecular weight of the product which is to be produced. For example, the use of azobisisobutyronitrile, lauroyl peroxide, benzoyl peroxide in bulk or aqueous suspension polymerization provides polymers which are partially crosslinked (e.g., they exhibit little or no solubility in organic solvents). Likewise, oxygenated organic solvents such as acetone and methyl ethyl ketone afford soluble products when using these catalysts.

The molecular weights of the final products (measured comparatively by kinematic viscosity of the final products in acetone at 10% concentration) are dependent upon the polymerization temperature, polymerization solvent and catalysts employed. For example, copolymerization of 2-phenylallyl alcohol and maleic anhydride in benzene with azobisisobutyronitrile, lauroyl peroxide or benzoyl peroxide at 50–60° C. affords polymers showing a kinematic viscosity (in acetone at 10% concentration) of about 3–4 centistokes, and when cumene is employed as a solvent with Lupersol 101 catalyst (2,5-dimethyl 2,5-ditertiarybutylperoxy hexane) at 152–156° C. the resulting polymer has a kinematic viscosity (10% in acetone) of about 1 centistoke.

The highest molecular weight products (non-crosslinked) are apparently formed in acetone and methyl ethyl ketone solvents. For example, azobisisobutylronitrile, lauroyl peroxide or benzoyl peroxide in these solvents provide products displaying viscosities (10% in acetone) of about 9–21 centistokes. It is, therefore, obvious that the precise polymerization conditions will be dictated by the nature of the product to be produced.

Polymerization temperatures will often vary from about 40° to 200° C., with the preferred temperature range being about 50–175° C. Initiator concentration will generally vary from about 0.1% to about 10%, with the preferred range being from about 0.5% to 5%. The concentration of monomers in solvents will usually vary from about 5% to 70%, with the preferred range being about 10% to 35%.

The present invention will be illustrated by the following examples.

EXAMPLE I

Copolymerization of 2-phenylallyl alcohol and maleic anhydride in bulk

Copolymerization of 2-phenylallyl alcohol (2–PAA) and maleic anhydride (MA) proceeds under bulk conditions using azobisisobutyronitrile initiator (AIBN). Bulk polymerization reactions were conducted in sealed polymerization tubes of 200 ml. capacity which were placed in a rotating polymerization bath at the desired temperature. The tubes were carefully purged with nitrogen after filling with monomers. Typical bulk polymerizations were carried out using charges of 1:1 mole of 2-phenylallyl alcohol to maleic anhydride. After polymerization was complete, the polymers were worked up removing the brittle resin from the polymerization tubes, crushing into fine particles and washing in benzene several times. The polymers were then dried in vacuum at 80° C. The products were brittle, yellow resins, which were soluble in aqueous ammonia and alkali, only slightly soluble in acetone, and partly soluble in methyl ethyl ketone and tetrahydrofuran. The polymerization conditions and results are summarized in Table I (Run 1).

The high degree of insolubility of the polymers made quantitative measurement of their infrared spectrum difficult. However, the polymer portion which was soluble in tetrahydrofuran displayed approximately equal concentrations of anhydride and ester bands, showing that crosslinking via esterification definitely took place prior to, or during the course of the polymerization reaction.

Evidence for the formation of lactone in all polymers derived from 2-phenylallyl alcohol and maleic anhydride is provided by a comparison of the acid number and saponification numbers. If the copolymers were exclusively in the anhydride form, the acid and saponification numbers would be expected to the identical within experimental error. However, in all cases of copolymer formation the acid numbers were somewhat greater than the calculated value of 241 (for 100% lactone) and less than the value of 483 (for 100% alternating anhydride copolymers). Hence it is logical to conclude that the copolymers comprise a combination of 5 and 6-membered lactone groups as well as free anhydride and hydroxyl groups.

With respect to the infrared spectrum of the bulk prepared copolymers of 2-phenylallyl alcohol and maleic anhydride, as well as solution prepared polymers carbonyl absorption was very strong in both the 5.62-micron region and the 5.75-micron region, but very weak or non-existent in the 5.4-micron region. Bands in the 5.4 and 5.62 region can be assigned to the anhydride group (anhydride exhibits this characteristic doublet). The very weak or nonexistent 5.4-micron band and the very strong 5.62- and 5.75-micron bands strongly suggest that both 5 and 6-membered lactone structures are present.

EXAMPLE II

Suspension copolymerization of 2-phenylallyl alcohol and maleic anhydride

Suspension polymerization was conducted at monomer ratios of 1:1 to 1:5 (2-PAA: Maleic Anhydride) using azobisisobutyronitrile (AIBN) as an initiator. Polyvinyl alcohol (PVA) at a concentration of 3% (based on total monomer weight) was uused as the suspending agent. The monomer concentration in water was 33%. After the polymerization reaction was complete, the white polymer, which was in the form of small beads and popcorn-like balls was washed several times with water and dried in vacuo at 60° C. These copolymers were insoluble in acetone and soluble in aqueous ammonia and alkali. The polymerization conditions and results are summarized in Table I (Runs 2 and 3).

The copolymers prepared in suspension were similar in solubility to those prepared in bulk, e.g., they were soluble in aqueous ammonia and alkali solutions, but were only partially soluble in acetone, methyl ethyl ketone and tetrahydrofuran. Infrared spectra of these materials were also similar.

The insolubility did not permit kinematic viscosity measurements to be made. The tetrahydrofuran soluble portion of the polymers showed a very high degree of esterification, probably lactone and crosslinked ester groups. In aqueous suspension systems, some of the anhydride groups probably hydrolyzed prior to or during polymerization to afford products less soluble in organic solvents. The low yield of the polymers obtained in suspension can be explained by the fact that maleic anhydride was unavailable in the polymerizing droplets of monomers, since it can readily hydrolyze during polymerization. In fact, the polymer yield based on 2-phenylallyl alcohol (Run 3) was about 65% based on 2-phenylallyl alcohol. The 4 mole excess of maleic anhydride used in the run was unquestionably responsible for this higher yield.

shown. The tubes were carefully flushed with nitrogen and sealed. The polymerization reactions were carried out at the times and temperatures shown in Table II (Runs 4-7) which also gives the polymerization conditions and summarizes the results. When benzene was used as a solvent, the polymers precipitated from solution during polymerization in the form of fine powder. The precipitates were filtered, washed initially with benzene and finally with pentane. The resulting polymer was then dried in vacuum at about 80° C. overnight to constant weight. The polymers prepared in benzene were soluble in aqueous ammonia and alkali. They were also soluble in acetone, methyl ethyl ketone, benzyl alcohol, dioxane, tetrahydrofuran, dimethyl formamide, dimethylacetamide, dimethyl sulfoxide and pyridine. They were insoluble in n-pentane, chloroform, tetrachloroethylene, ethyl acetate, acetonitrile, diisobutyl ketone and benzene.

Azobisisobutyronitrile was found to be the most efficient initiator for copolymerization. The copolymers prepared in benzene solution were higher melting than those prepared under bulk and suspension conditions and were also soluble in acetone. The infrared spectra of the copolymers showed absorption of approximately equal intensity in the 5.75 micron region (indicating presence of linear ester or 6-membered lactone), and at 5.62 microns. The latter band could be attributed to anhydride or 5-membered lactone, as stated previously.

EXAMPLE IV

Solution copolymerization of 2-phenylallyl alcohol and maleic anhydride (1:1 mole ratio) at 33% monomer concentration: solution copolymerization in organic solvents Solution polymerization of 2-phenylallyl alcohol and maleic anhydride was carried out in methyl ethyl ketone (MEK) and acetone solvents with azobisisobutyronitrile, lauroyl peroxide and benzoyl peroxide initiators. Under these conditions, the polymerization reaction proceeded under "precipitating conditions," e.g., the polymer precipitated from solution immediately during its formation. The conditions and results of these polymerzations are summarized in Table II (Runs 8-13).

The results of the foregoing polymerization showed that the polymerization proceeded in near quantiative yield in each case, indicating that true solution polymerization can effectively be employed to prepare 2-phenylallyl alcohol-maleic anhydride polymers. The methyl ethyl ketone runs were essentially "gelled" upon completion of polymerization, suggesting that a solids concentration lower than 33% would be preferable to obtain products which are TABLE I.—COPOLYMERIZATION OF 2-PHENYLALLYL ALCOHOL AND MALEIC ANHYDRIDE IN BULK AND SUSPENSION SYSTEMS

| Run No. | Mole ratio, 2-PAA/MA | Initiator and conc. percent | Reac. medium | Poly. temp. time, Hrs. | Yield of polymer, wt. percent | Sap. No. (1), found/calc. | Acid No. (2), found/calc. | Melting range,[3] ° C. | Qual. Infrared Analysis 5.4 | 5.62 | 5.75μ |
|---|---|---|---|---|---|---|---|---|---|---|---|
| 1 | 1:1 | AIBN, 1 | Bulk | 50/64 | 92.5 | 412/483 | 368/242 | 172-189-235 | Weak | Strong | Strong. |
| 3 | 1:1 | AIBN, 1.5 | H₂O, 33%; PAV, 3% | 50/60 | 22.2 | 214/483 | 141/242 | 89-97-124 | Trace | Weak | Do. |
| 2 | 1:5 | AIBN, 1.5 | H₂O, 33%; PAV, 3% | 50/60 | 24.1 | 329/483 | 267/242 | 128-140-158 | do | do | Do. |

[1] Saponification number (theory) calculated on basis of 1:1 alternating copolymer with repeating monomer unit of 232.2 molecular weight, e.g., no end-groups considered in calculation.
[2] Acid number (theory) calculated on basis of 100% lactone formation in copolymer with repeating monomer unit of 232.2 molecular weight, e.g., no end-groups considered in calculation.
[3] Melting range reported as softening point, initial and final melting points respectively.

EXAMPLE III

Batch copolymerization of 2-phenylallyl alcohol and maleic anhydride in benzene at 1:1 mole ratio of 2-PAA:maleic anhydride Batch copolymerization of 2-phenylallyl alcohol and maleic anhydride were carried out in 200 ml. polymerization tubes using benzene as a solvent and the initiators less viscous and easier to handle mechanically. The products produced in acetone were less viscous and were more easily worked up. When acetone or methyl ethyl ketone was used as the solvent, it was necessary to add a non-solvent such as benzene to precipitate the polymer from solution. The polymers prepared in methyl ethyl ketone and acetone were soluble in aqueous ammonia, aqueous alkali, methyl ethyl ketone and acetone. The infrared spectra of the polymers prepared using this technique showed absorption at 5.62 and 5.75 microns indicating 5-membered lactone or anhydride, or 6-membered lactone, as well as linear ester.

pected to show a somewhat higher viscosity than a styrene-maleic anhydride resin of comparable molecular weight owing to the presence of the acetate group of the 2-PAA-maleic anhydride copolymer, which would make the polymer molecule less coiled in solution. The copolymers TABLE II.—SOLUTION COPOLYMERIZATION OF 2-PHENYLALLYL ALCOHOL WITH MALEIC ANHYDRIDE IN SOLUTION BATCH SYSTEM

| Run number: | Mole ratio, 2-PAA:MA | Initiator and conc., percent | Reaction medium | Poly. temp., °C./time, hrs. | Yield of polymer, wt. percent |
|---|---|---|---|---|---|
| 4 | 1:1 | AIBN, 1 | Benzene | 50/72 | Quantitative. |
| 5 | 1:1 | AIBN, 5 | do | 50/72 | Do. |
| 6 | 1:1 | Lauroyl peroxide, 1.0 | do | 60/60 | 77.1. |
| 7 | 1:1 | Benzoyl peroxide, 1 | do | 60/60 | 77.1. |
| 8 | 1:1 | AIBN, 1 | MEK | 60/60 | Quantitative. |
| 9 | 1:1 | Lauroyl peroixide, 1 | MEK | 60/60 | Do. |
| 10 | 1:1 | Benzoly peroxide, 1 | MEK | 60/60 | Do. |
| 11 | 1:1 | AIBN, 1 | Acetone | 60/60 | Do. |
| 12 | 1:1 | Lauroly peroxide, 1 | do | 60/60 | Do. |
| 13 | 1:1 | Benzoyl peroxide, 1 | do | 60/60 | Do. |

| Run number: | Sap. No.[1], found/calc. | Acid No.[2], found/calc. | Kin. Vis.[3] in acetone, 1090, cs. | Percent C, H found [4] | Infarerd spectrum |
|---|---|---|---|---|---|
| 4 | 441/483 | 343/242 | 4.16 | C, 64.33 / H, 5.2 | 5.4μ, trace. / 5.62μ, moderate. / 5.75μ, strong. |
| 5 | 415/483 | 323/242 | 3.68 | C, 65.97 / H, 5.73 | 5.4μ, trace. / 5.62μ, moderate. / 5.75μ, strong. |
| 6 | 451/483 | 321/242 | 4.05 | | 5.4μ, weak. / 5.62μ, moderate. / 5.75μ, strong. |
| 7 | 442/483 | 308/242 | 3.2 | | 5.4μ, trace. / 5.62μ, moderate to strong. / 5.75μ, strong. |
| 8 | 267/483 | 255/242 | 14.3 | | Incomplete. |
| 9 | (5) | (5) | 21.07 | | Do. |
| 10 | (5) | (5) | 12.4 | | Do. |
| 11 | 273/483 | 265/242 | 9.3 | | Do. |
| 12 | 273/483 | 264/242 | 13.9 | | Do. |
| 13 | (5) | (5) | 9.2 | | Do. |

[1] Theoretical sap. no. calcn. based on 100% alternating anhydride copolymer.
[2] Theoretical acid no. calcn. based on 100% lactone formation.
[3] Kin. Vis. measured with #150 Cannon-Fenske vis. tube at 10 gms. polymer/100 ml. acetone soln. Melting ranges of polymers (° C.) were as follows: Run 4, 300–302; Run 5, 300–302; Run 6, 304–310; Run 7, 306–315; Run 8, above 305° C.; Runs 9–13, above 305° C.
[4] Theoretical value for carbon and hydrogen, based on 1:1 alternating copolymer (end groups not considered) is percent C, 67.23; percent H, 5.21.
[5] Inconclusive.

EXAMPLE V

Batch solution copolymerization of 2-phenylallyl acetate and maleic anhydride

The batch copolymerization of 2-phenylallyl acetate and maleic anhydride was carried out in 200 ml. polymerization tubes, in a polymerization bath, in the same manner described for 2-phenylallyl alcohol-maleic anhydride. In these experiments the combined monomer charge was 36 grams (12.9 grams of maleic anhydride and 23.2 grams of 2-phenylallyl acetate). This corresponds to a 1:1 mole ratio of 2-phenylallyl acetate and maleic anhydride. The polymer deposited on the walls of the polymerization tube in the form of a transparent resin. The polymer was dissolved in methyl ethyl ketone and precipitated with benzene and was then filtered, washed with benzene, then pentane, and dried in vacuo at 50° C. to constant weight. Polymerization reactions of 2-phenylallyl acetate and maleic anhydride were carried out in benzene at 50° C. for 38 hours to afford polymers in yields of 65% and 37%, respectively. The copolymers precipitated from solution during polymerization and were filtered and dried. The conditions of these polymerizations and the results are given in Table III (Runs 14 and 15).

Comparison of the viscosity data of these materials with viscosity of styrene-maleic anhydride resins indicates that the molecular weights are in the 2000–3000 range. The 2-phenyallyl alcohol-maleic anhydride would be ex- of 2-phenylallyl acetate and maleic anhydride were soluble in aqueous ammonia and alkali. They were also soluble in tetrahydrofuran, acetone, methyl ethyl ketone and insoluble in benzene, chloroform, pentane and most non-oxygenated organic solvents.

EXAMPLE VI

Terpolymerization of 2-phenylallyl alcohol, maleic anhydride and styrene using delayed addition technique in cumene solvent at 33% monomer solids The terpolymerization experiments were conducted by the delayed addition technique. By this method the monomers and catalysts are first dissolved in a portion of the solvent in which the polymerization is to be conducted and the resulting solution fed in increments into a reactor containing solvents heated to reaction temperature. The 1:3:4 terpolymers (mole ratio of 2-phenylallyl alcohol: styrene:maleic anhydride) were soluble in aqueous ammonia, aqueous alkali, and largely soluble in acetone, methyl ethyl ketone, tetrahydrofuran, dimethyl sulfoxide and dimethylformamide. The 1:1:1 terpolymer was only partially soluble in aqueous ammonia and alkali, insoluble in acetone, methyl ethyl ketone and partially soluble in dimethyl formamide, tetrahydrofuran and dioxane. The conditions of the polymerizations and the results are summarized in Table III (Runs 16, 17).

TABLE III

| Run No. | Initiator and conc., percent | Reac.[1] medium | Poly. temp.[2], time | Yield of poly. wt. percent | Sap. No.[5], found/ calc. | Acid No.[5], found/ calc. | C/H Found percent C | C/H Found percent H | Melting range, °C. | Kin. Vis[4] in 10 percent acetone cs. | Qual. Infrared Anal. 5.4μ | Qual. Infrared Anal. 5.62μ | Qual. Infrared Anal. 5.75μ |
|---|---|---|---|---|---|---|---|---|---|---|---|---|---|
| 14 | AIBN, 1 | Benzene | 50/38 | 65 | 503/613 | 381/409 | 66.40 | 5.47 | 236-268 | 1.57 | Strong | Strong | Strong. |
| 15 | AIBNA, 1 | do | 50/38 | 37 | 520/613 | 384/409 | 66.30 | 5.40 | 242-265 | 1.58 | do | do | Do. |
| 16 | Lup 101, 1 | Cumene | 152-6/6 | (7) | [4]363/535 | [5]420/535 | | | 225-243 | | Moderate | do | Do. |
| 17 | Lup 101, 1 | do | 152-6/6 | 81 | 361/336 | 250/336 | | | 268-277 | | do | do | Do. |

[1] Total solids content of reaction medium was 33% after addition of Solution A.
[2] Rate of addition of Solution A was 15 ml./minute in each run.
[3] Osmometric molecular weight determination was conducted on the product of run 16 and was 2157.
[4],[5] Calculated on basis of monomer charged and 100% anhydride structure.
[6] Refers to softening point, initial and final melting points, respectively.
[7] Quantitative.

The conversion of total monomer to polymer was near quantitative in the 1:3:4 experiment and about 81% in the 1:1:1 experiment. The infrared spectrum of both polymers showed evidence of ester in addition to anhydride groupings, indicating that the 2-phenylallyl alcohol was definitely incorporated into the polymer network. Good evidence for the formation of terpolymer is provided by the high melting points of the products, e.g., they are higher than the melting points of styrene-maleic anhydride resins prepared under comparable conditions and somewhat lower than 2-phenylallyl alcohol-maleic anhydride copolymers already described. The 1:3:4 polymer was readily soluble in alkali and aqueous ammonia solutions as well as acetone and other organic solvents. The 1:1:1 polymer was only partially soluble in aqueous alkali and ammonia solutions, indicating the presence of styrene homopolymer, a copolymer of styrene and 2-phenylallyl alcohol or cross-linked material. The fact that the latter polymer was not completely soluble in acetone indicates that some crosslinking took place during the course of the polymerization reaction.

It is claimed:

1. A solid alternating polymer of a first monomer selected from the group consisting of 2-phenylallyl alcohol and 2-phenylalyl acetate and a second monomer selected from the group consisting of maleic anhydride and maleic acid wherein the mole ratio of said first monomer to said second monomer is from about 1:0.9 to 1:8, said polymer having a melting point in the range of about 80° C. to about 310° C. and being soluble in aqueous ammonia and alkali.

2. A solid alternating polymer of claim 1 wherein the mole ratio of said first monomer to said second monomer is from about 1:1 to 1:5.

3. A solid alternating polymer of claim 2 wherein said first monomer is 2-phenylallyl alcohol and said second monomer is maleic anhydride.

4. A solid alternating copolymer of 2-phenylallyl alcohol and maleic anhydride in about 1:1 mole ratio, said copolymer having a melting point in the range of about 80° C. to about 310° C. and being soluble in aqueous ammonia and alkali.

5. A solid alternating copolymer of 2-phenylallyl acetate and maleic anhydride in about 1:1 mole ratio, said copolymer having a melting point in the range of about 80° C. to about 310° C. and being soluble in aqueous ammonia and alkali.

6. A solid alternating polymer of a first monomer selected from the group consisting of 2-phenylallyl alcohol and 2-phenylallyl acetate, a second monomer selected from the group consisting of maleic anhydride and maleic acid, and a third monomer which is a polymerizable vinyl compound other than those constituting the first or second monomers, wherein the mole ratio of first monomer to second monomer to third monomer is from 1:0.9:0 to 1:8:8, said polymer having a melting point in the range of about 80° C. to 310° C. and being at least partially soluble in aqueous ammonia and alkali.

7. A solid alternating polymer of claim 6 wherein the mole ratio of first to second to third monomer is from about 1:1:1 to 1:5:5.

8. A solid alternating polymer of claim 6 wherein the first monomer is 2-phenylallyl alcohol, the second monomer is maleic anhydride and the third monomer is styrene.

9. A solid alternating polymer of claim 8 wherein the mole ratio of first monomer to second monomer to third monomer is about 1:1:1.

10. A solid alternating polymer of claim 8 wherein the mole ratio of first monomer to second monomer to third monomer is about 1:3:4 and said polymer is soluble in aqueous ammonia and alkali.

11. A solid alternating polymer of claim 7 wherein the first monomer is 2-phenylallyl acetate, the second monomer is maleic anhydride and the third monomer is styrene.

12. A solid alternating polymer of a first monomer selected from the group consisting of 2-phenylallyl alcohol and its alkyl esters having up to about 24 carbon atoms in the alkyl group and a second monomer selected from the group consisting of maleic anhydride and maleic acid wherein the mole ratio of said first monomer to said second monomer is from about 1:0.9 to 1:8, said polymer having a high melting point of at least about 80° C. and being at least partially soluble in aqueous ammonia and alkali or in hydrocarbon solvents.

13. A solid alternating polymer of claim 12 wherein the mole ratio of said first monomer to said second monomer is from about 1:1 to 1:5.

14. A solid alternating polymer of a first monomer selected from the group consisting of 2-phenylallyl alcohol and its alkyl esters having up to about 24 carbon atoms in the alkyl group, a second monomer selected from the group consisting of maleic anhydride and maleic acid, and a third monomer which is a polymerizable vinyl compound other than those constituting the first or second monomers, wherein the mole ratio of first monomer to second monomer to third monomer is from 1:0.9:0 to 1:8:8, said polymer having a high melting point of at least about 80° C. and being at least partially soluble in aqueous ammonia and alkali or in hydrocarbon solvents.

15. A solid alternating polymer of a first monomer selected from the group consisting of 2-phenylallyl alcohol and its alkyl esters having up to about 24 carbon atoms in the alkyl group and a second monomer selected from the group consisting of maleic anhydride, maleic acid and its alkyl esters having up to about 24 carbon atoms in the alkyl group, wherein the mole ratio of said first monomer to said second monomer is from about 1:0.9 to 1:8, said polymer having a high melting point of at least about 80° C. and being at least partially soluble in aqueous ammonia and alkali or in hydrocarbon solvents.

16. A solid alternating polymer of a first monomer selected from the group consisting of 2-phenylallyl alcool and its alkyl esters having up to about 24 carbon atoms in the alkyl group, a second monomer selected from the group consisting of maleic anhydride, maleic acid and its alkyl esters having up to about 24 carbon atoms in the alkyl group, and a third monomer which is a polymerizable vinyl compound other than those constituting the first or second monomers, wherein the mole ratio of first monomer to second monomer to third monomer is from 1:0.9:0 to 1:8:8, said polymer having a high melting point of at least about 80° C. and being at least partially soluble in aqueous ammonia and alkali or in hydrocarbon solvents.

References Cited

UNITED STATES PATENTS

| | | | |
|---|---|---|---|
| 2,507,871 | 5/1950 | Tawney | 260—78.5 |
| 2,537,622 | 1/1951 | Butler | 260—91.3 XR |
| 2,855,388 | 10/1958 | Chapin et al. | 260—78.5 |
| 2,995,535 | 8/1961 | Gethins et al. | 260—78.5 XR |

JOSEPH L. SCHOFER, Primary Examiner

J. KIGHT III, Assistant Examiner

U.S. Cl. X.R.

44—62; 106—3, 38.2; 117—161